United States Patent [19]

Soyk et al.

[11] Patent Number: 4,629,391

[45] Date of Patent: Dec. 16, 1986

[54] POWERED LIFTER

[76] Inventors: Melvin A. Soyk, 4610 Hwy. 33 W., West Bend, Wis. 53095; Dean E. Mitchell, 3494 Lake Dr., Hartford, Wis. 53027

[21] Appl. No.: 658,526

[22] Filed: Oct. 9, 1984

[51] Int. Cl.[4] .................................................. B60P 3/12

[52] U.S. Cl. ........................................ 414/563; 254/84; 180/19.1; 180/306

[58] Field of Search ........................... 414/563; 254/84; 180/19.1, 19.2, 306, 904

[56] References Cited

U.S. PATENT DOCUMENTS

| | | | |
|---|---|---|---|
| 2,336,831 | 12/1943 | Ashworth | 187/9 |
| 3,312,300 | 4/1967 | Jones | 180/19.2 |
| 3,489,249 | 1/1970 | Stammen | 187/9 |
| 3,522,892 | 8/1970 | Vegors | 414/563 |
| 3,759,407 | 9/1973 | Boster et al. | 414/563 |
| 3,834,667 | 9/1974 | Sanger | 254/2 R |
| 3,841,506 | 10/1974 | Smith | 414/563 |
| 3,961,681 | 6/1976 | Fisher | 180/306 X |
| 4,186,813 | 2/1980 | Burdick | 180/13 |
| 4,210,217 | 7/1980 | Lachowicz | 180/13 |

FOREIGN PATENT DOCUMENTS

| | | | |
|---|---|---|---|
| 385467 | 12/1932 | United Kingdom | 414/563 |
| 1410004 | 10/1975 | United Kingdom | 180/19.2 |

*Primary Examiner*—Robert J. Spar
*Assistant Examiner*—Ken Muncy
*Attorney, Agent, or Firm*—Andrus, Sceales, Starke & Sawall

[57] ABSTRACT

A powered lifter that enables one person to move loads such as cars, trucks, farm equipment, trailers and the like from one location to another. The device includes a rear frame supported by a pair of wheels that mounts an upstanding telescoping mast having a rotatable load supporting carriage at its upper end and a hydraulic cylinder connected to the mast for raising and lowering the carriage. The device also includes a front frame pivotally connected to the rear frame and supported by a drive wheel which is driven by a hydraulic motor and steered by a steering arm connected to the front frame which also houses the electronic circuitry for the device. A cabinet is mounted on the rear frame for housing the electrical and hydraulic components for the device, and for reinforcing the frame to avoid sagging and lateral shifting of the frame.

17 Claims, 5 Drawing Figures

FIG. 1
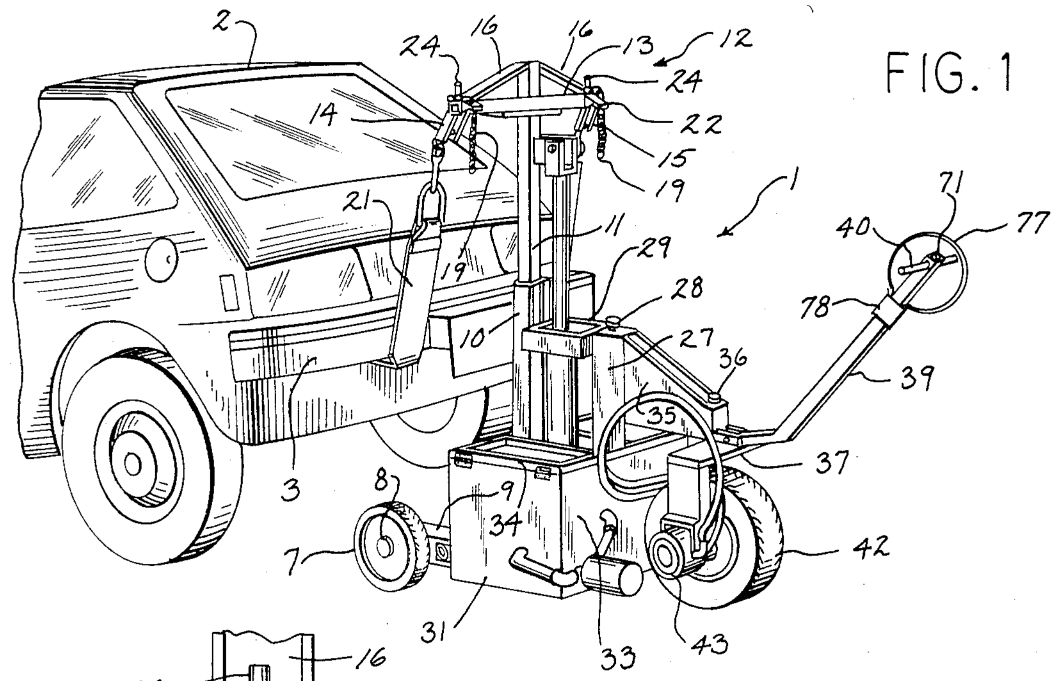
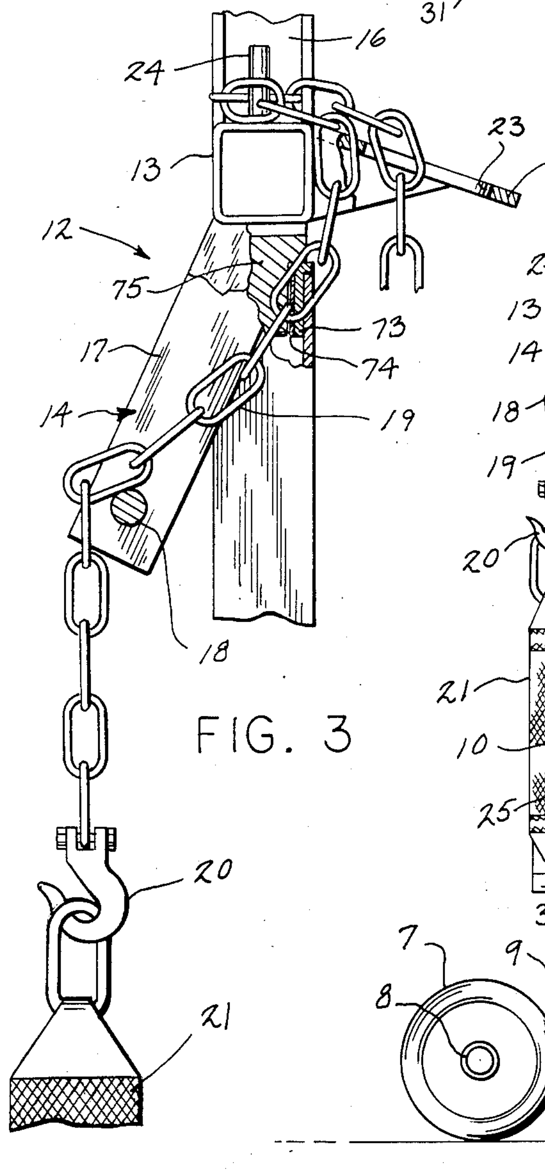
FIG. 3
FIG. 2
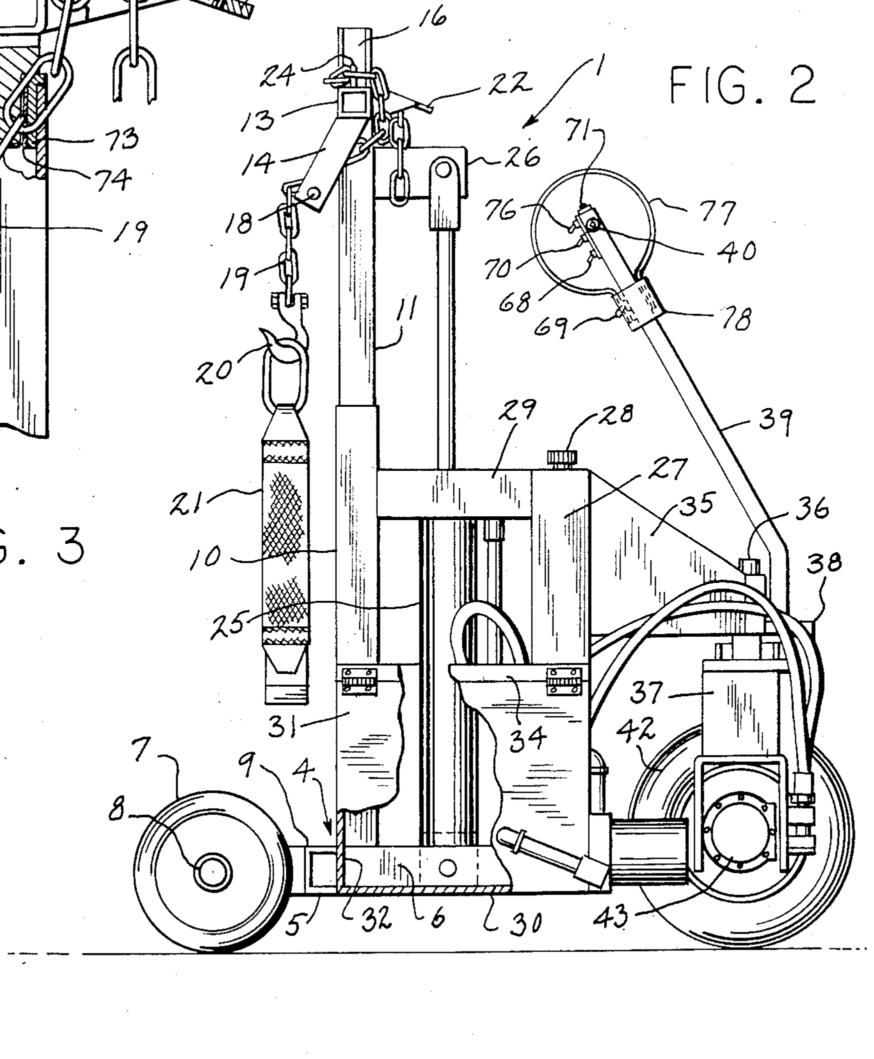

FIG. 4
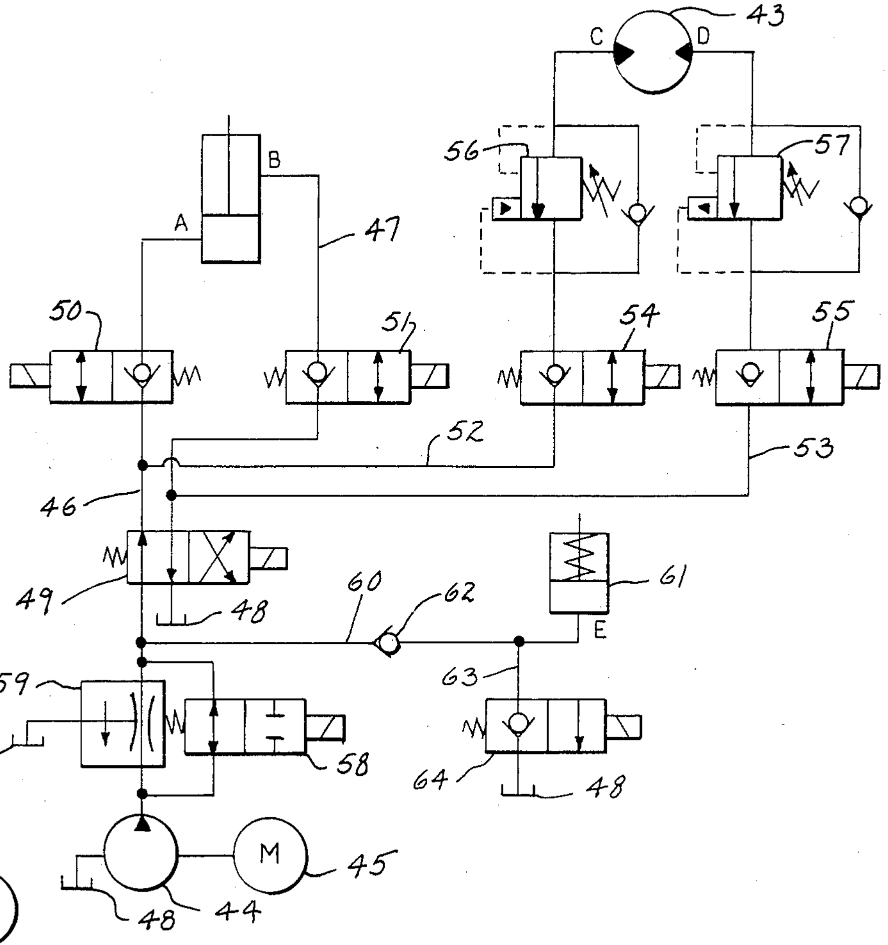
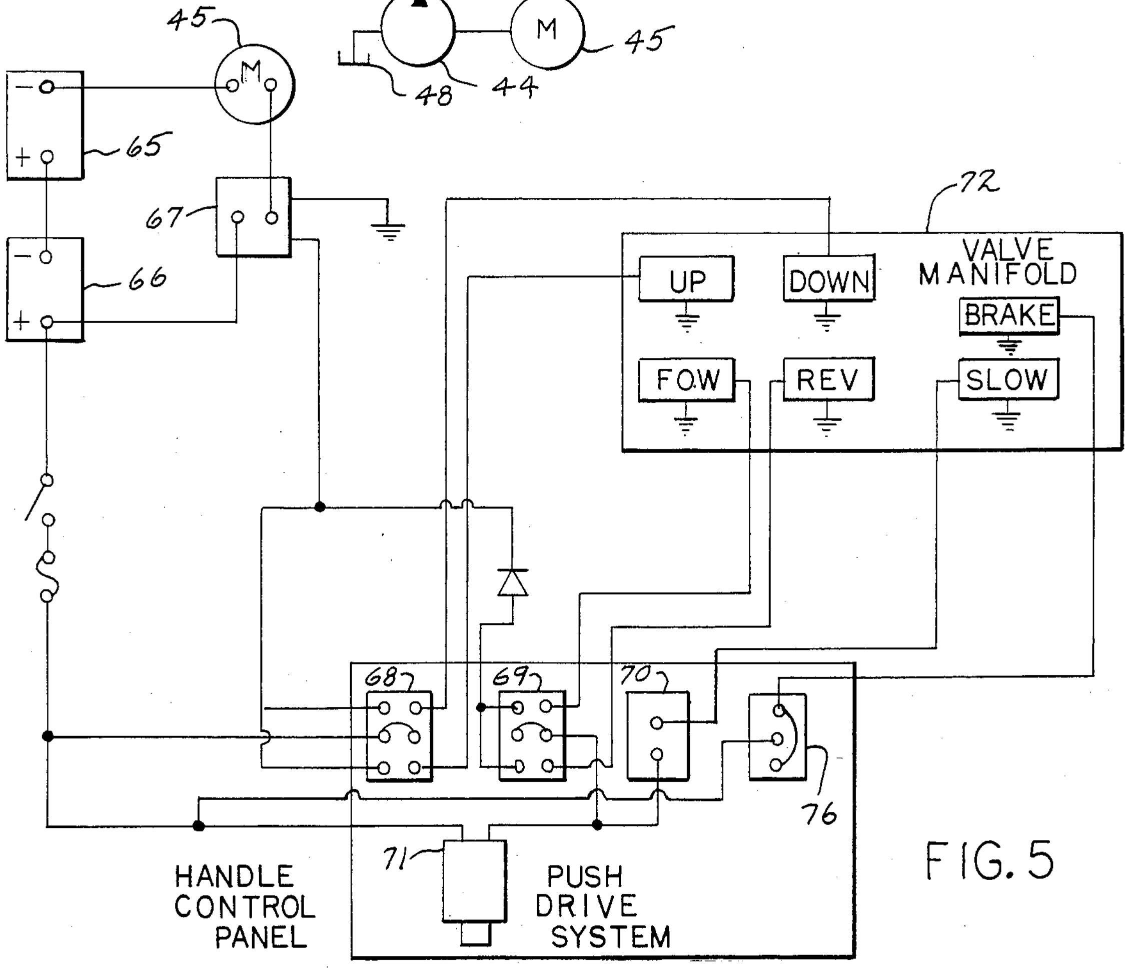
FIG. 5

POWERED LIFTER

BACKGROUND OF THE INVENTION

The present invention relates to power driven wheeled land vehicles, and more particularly to a powered lift truck that enables a single person to move heavy loads from one location to another.

Auto dealers, service stations, auto body shops, truck centers, farm implement sales and service dealers, mobile home centers, boat storage centers, boat manufacturers and other similar facilities often must move equipment from their yards or showrooms to a service area or storage area and vice versa. This task often requires expensive wreckers, tractors, trucks or other cumbersome equipment. Examples of such equipment can be found in the following U.S. patents:

| U.S. Pat. No. | Inventor | Issue Date |
|---|---|---|
| 2,336,831 | Ashworth | Dec. 14, 1943 |
| 3,489,249 | Stammen | Jan. 13, 1970 |
| 3,834,667 | Sanger | Sept. 10, 1974 |
| 4,186,813 | Burdick | Feb. 5, 1980 |
| 4,210,217 | Lachowicz | Jul. 1, 1980 |

Each of the above previously available devices for moving loads suffer from problems of stability, maneuverability, convenience and cost.

SUMMARY OF THE INVENTION

A powered lift truck for lifting and transporting loads such as cars, trucks, farm equipment, trailers, boats and the like from one location to another by a single operator. The device moves disabled vehicles or other non-selfpropelled equipment by means of lifting and towing. The compactness, maneuverability and power of this device contributes to its ease of operation and makes it possible to guide loads into tight spaces otherwise requiring tow trucks, tractors or other cumbersome equipment as well as two or more able-bodied persons to physically move the load.

The device includes a rear frame supported by a pair of wheels that mounts an upstanding telescoping mast having a rotatable load supporting carriage at its upper end and a hydraulic cylinder connected to the mast for raising and lowering the carriage. The device also includes a front frame pivotally connected to the rear frame and supported by a drive wheel which is driven by a hydraulic motor and steered by a steering arm connected to the front frame which also houses the electronic circuitry for the device. A cabinet is mounted on the rear frame for housing the electrical and hydraulic components for the device, and for reinforcing the frame to avoid sagging and lateral shifting thereof.

BRIEF DESCRIPTION OF THE DRAWINGS

The drawings illustrate the best mode presently contemplated of carrying out the invention.

In the drawings:

FIG. 1 is a fragmentary perspective view illustrating a powered lift truck constructed in accordance with the principles of the present invention lifting the rear end of an automobile;

FIG. 2 is a side view in elevation with parts broken away of the lift truck of FIG. 1;

FIG. 3 is an enlarged fragmentary view with parts broken away and in section illustrating the attachment of an adjustable sling to the end of a load support carriage for the lift truck;

FIG. 4 is a schematic diagram of the hydraulic control circuitry for the powered lift truck of FIG. 1; and FIG. 5 is a schematic diagram of an electrical control circuit for the powered lift truck of FIG. 1.

DESCRIPTION OF THE PREFERRED EMBODIMENT

Referring now to the drawings, FIG. 1 illustrates a powered lift truck designated generally the numeral 1 lifting an automobile 2 off the ground by its rear bumper 3. Although automobile 2 is illustrated in FIG. 1 as the load being lifted by truck 1, truck 1 is readily adaptable to lift and transport any type of disabled vehicle or non-selfpropelled equipment in addition to automobiles such as trucks, farm equipment, trailers, boats and the like.

Lift truck 1 includes a T-shaped rear frame 4 having a laterally extending channel member 5 and a longitudinally extending channel member 6 extending forwardly from the center of channel member 5. Each channel member 5 and 6 is U-shaped with the opening of member 5 facing forwardly and the opening of member 6 facing upwardly. Members 5 and 6 are welded together to provide a rigid chassis for lift truck 1. A pair of rear wheels 7 (only one of which is shown) support rear frame 4 off the ground. Each wheel 7 is rotatably mounted on a stub shaft 8 which in turn is journalled in a channel member 9 projecting rearwardly from opposite ends of channel member 5 so that members 5 and 9 form a U-shaped structure.

An upstanding telescoping mast is mounted on rear frame 4 and includes a hollow stationary mast member 10 mounted at its lower end on the rearward portion of channel member 6. A vertically movable inner mast member 11 is telescopically received within member 10 for movement between an upper load lifting position and a lower load releasing position. Inner member 11 includes a sleeve 73 with a bushing 74 pressed therein at its upper end which accepts a vertical pin or yoke 75 depending from the center of a load supporting carriage 12. Load support carriage 12 may thus be rotated 360° with respect to mast member 11, and is mounted for vertical movement therewith at its upper end. Carriage 12 also includes a crossbar member 13 extending transversely of mast member 11 in a lateral direction, and a pair of rearwardly projecting bracket members 14 and 15 spaced on opposite ends of crossbar member 13. A pair of braces 16 extend between the top of mast member 11 and opposite ends of crossbar member 13 to reinforce and stabilize crossbar member 13. Each bracket member 14 and 15 includes a pair of spaced apart side members 17 extending downwardly and rearwardly from the lower end of crossbar member 13 and a transverse member 18 extending between the outer ends of side member 17. Carriage 12 also includes a pair of slings spaced on opposite ends of the crossbar member 13 and supported by bracket members 14 and 15. Each sling includes a chain portion 19 having a plurality of interconnecting links with a hook 20 at one end for attaching a strap 21 which in turn may be attached to bumper 3 of automobile 2 or any other suitable member such as the axle of automobile 2.

The length of chain portions 19 and consequently the length of each sling with respect to the ends of crossbar member 13 may be varied or adjusted as desired by means of a pair of mounting plates 22 spaced on opposite ends of crossbar member 13 and projecting forwardly therefrom. Each mounting plate 22 includes a longitudinal slot 23 formed therethrough for receiving one of the links of chain portion 19 to lock chain portion 19 at a desired position. As shown best in FIG. 3, chain portions 19 are trained about a pair of upright pins 24 spaced on opposite ends of crossbar member 13. Chain portions 19 are also trained around the forward side of crossbar member 13 and between side members 17 of bracket members 14 and 15 and over transverse member 18. This path secures the chain portion 19 from any movement during lifting and enables truck 1 to closely approach a load such as automobile 2 to hook up the lower ends of straps 21.

An upstanding fluid actuated hydraulic lift cylinder 25 is disposed parallel to and forwardly of mast members 10 and 11. The lower end or cylinder end of cylinder 25 is pinned to channel member 6 adjacent the lower end of stationary mast member 10 within channel member 6. The rod end of cylinder 25 is connected to a plate 26 projecting forwardly from inner mast member 11.

An upstanding support member 27 is mounted on the forward end of channel member 6 and extends vertically upwardly adjacent cylinder 25 and parallel to both cylinder 25 and mast members 10 and 11. Support member 27 is hollow and serves as a reservoir for hydraulic fluid and for this purpose includes a filler cap 28. A square reinforcing bracket 29 extends between and is affixed to support member 27 and stationary mast member 10. Bracket 29 lends rigidity and stability to mast members 10 and 11 and support member 27. It should be noted that mast members 10 and 11 are in the form of square tubes which aid in relieving any fore and aft or sideways strain on the lift cylinder 25. This arrangement and the location of cylinder 25 distributes the weight evenly on rear frame 4 providing traction and stability.

A cabinet is mounted on rear frame 4 and functions to house most of the electrical and hydraulic components for lift truck 1 and reinforce rear frame 4. The cabinet includes a bottom wall 30, a pair of opposite side walls 31, an upright rear wall 32 and an upright front wall 33. Bottom wall 30 is affixed to channel members 5 and 6 to aid in preventing lateral movement of channel member 6. Rear wall 32 extends along the entire length of channel member 5 and closes off the channel opening of member 5. Wall 32 is affixed to both channel member 5 and stationary mast member 10 to aid in preventing sagging of channel member 5. Front wall 33 is parallel to rear wall 32 and is affixed to support member 27 to lend added rigidity to the structure. A pair of lids 34 are hinged to side walls 31 for easy access to the interior of the cabinet.

A bracket 35 projects forwardly from support member 27 and includes a pin 36 at its forward end for pivotally mounting an L-shaped front frame 37. Bracket 35 also includes a forward extension 38 for pivotally mounting a steering arm 39. Steering arm 39 is pivotally mounted about a horizontal axis for movement in a vertical plane and is employed to pivot front frame 37 relative to rear frame 4 for steering lift truck 1. Steering arm 39 also includes a handle 40 at its forward end and houses the electrical circuitry for controlling the operation of lift truck 1. A drive wheel 42 is rotatably mounted directly on the drive shaft of a hydraulic drive motor 43 which in turn is mounted on front frame 37. Front frame 37 and drive wheel 42 are located sufficiently forward of rear frame 4 to enable 180° rotation about pin 36 to permit ease in turning a load in tight spaces.

Referring now to FIG. 4, the hydraulic system for lift truck 1 is schematically illustrated and includes a hydraulic pump 44 for pumping fluid, and an electric motor 45 for rotating pump 44 to move hydraulic fluid to and from cylinder 25 and drive motor 43. Fluid line 46 extends between pump 44 and port A of cylinder 25, and a second fluid line 47 extends between port B of cylinder 25 and reservoir or sump 48. An electrically actuated cross-over shuttle valve 49 is interposed in fluid lines 46 and 47 to control fluid flow therein. Valve 49 is a solenoid operated, spring returned two position, four-way valve and is used to control fluid flow in lines 46 and 47. The hydraulic system also includes an electrically actuated flow control shuttle valve interposed in fluid line 46 between valve 49 and port A of cylinder 25. Valve 50 is solenoid operated and spring returned and in its spring returned position includes a check valve that permits fluid flow only in one direction, i.e. from valve 49 to port A of cylinder 25. In its actuated position, valve 50 allows fluid flow in either direction between cylinder 25 and valve 49. A second electrically actuated flow control shuttle valve 51 is interposed in fluid line 47 between port B of cylinder 25 and valve 49. Valve 51 is solenoid operated and spring returned and is identical in its operation as shuttle valve 50 except with respect to port B.

A third fluid line 52 extends between fluid line 46 and port C of hydraulic drive motor 43 and communicates with line 46 at a location between shuttle valve 50 and cross-over valve 49. A fourth fluid line 53 extends between line 47 and port D of hydraulic motor 43 and communicates with line 47 at a location between shuttle valve 51 and cross-over valve 49. A third electrically actuated flow control shuttle valve 54 is interposed in fluid line 52 that is solenoid operated and spring returned and having an operation identical to valves 50 and 51 except with respect to port C of motor 43. A fourth electrically actuated flow control shuttle valve 55 is interposed in fluid line 53 and also is solenoid operated and spring returned to operate identically as valves 51, 50 and 54 except with respect to port D. A pilot operated counterbalance valve 56 is disposed in fluid line 52 between shuttle valve 54 and port C of motor 43. A second pilot operated counterbalance valve is disposed in fluid line 53 between shuttle valve 55 and port D of drive motor 43.

The hydraulic system also includes a normally open electrically actuated two-way valve 58 disposed in line 46 between cross-over valve 49 and pump 44. Valve 58 is solenoid operated and spring returned and in its spring returned position allows fluid flow to bypass a priority flow control valve 59 arranged in parallel relationship with valve 58 in line 46. Priority valve 59 is also located between cross-over valve 49 and pump 44 and functions to limit the flow of hydraulic fluid from pump 44 through cross-over valve 49 when valve 58 is actuated to a closed position.

The fluid system also includes a fluid line 60 communicating between a spring loaded on and fluid actuated off brake cylinder 61 and fluid line 46. Line 60 communicates with line 46 at a location between cross-over valve 49 and valves 58 and 59. A check valve 62 is disposed in line 60 to allow fluid flow only from line 46 to port E of brake cylinder 61. A fluid line 63 extends between line 60 and reservoir 48 and communicates with line 60 at a location between check valve 62 and port E of brake cylinder 61. An electrically actuated normally closed two-way valve 64 is disposed in line 63. Valve 64 is solenoid operated and spring returned and in its spring returned position prevents fluid flow from line 60 to reservoir 48 and thus enables fluid pressure to act against cylinder 61 to release brakes from rear wheels 7. When energized, valve 64 diverts flow from brake cylinder 61 so that the spring in cylinder 61 acts to apply brakes against rear wheels 7 and prevent movement thereof.

Referring now to FIG. 5, there is schematically shown an electronic control circuit which activates electric motor 45 and valves 49–51, 54–55, 58 and 64 in the appropriate sequence to raise and lower a load and drive lift truck 1. The electric control circuit includes two 12-volt batteries 65 and 66 wired in series for 24 volts. The electric circuit also includes a 24 volt contactor assembly or starter solenoid 67 which is connected to three toggle switches 68–70 and a push button 71 located on control box 41 on steering arm 39. Switches 68–70 and button 71 in turn are electrically wired to the solenoids of valves 49–51, 54–55, 58 and 64 which are all located in a valve manifold 72. Toggle switch 68 is a spring centered to neutral switch that controls the raising and lowering of a load by extending or retracting cylinder 25. Toggle switch 69 is a double-acting switch and controls the driving of drive wheel 42 by means of motor 43. Toggle switch 70 is used to energize or deenergize two-way valve 58. When valve 58 is deenergized a load may be lifted faster or drive wheel 42 may be driven faster than when energized since when energized fluid must flow through the restriction in valve 59. Push button 71 is employed to actuate toggle switch 69 to permit actual towing of a load by truck 1. Toggle switch 76 when actuated in either direction will result in application of the brakes against rear wheels 7. These brakes are in addition to the stopping power of drive motor 43 and valve 54 and 55. These parking brakes will be used mainly for safety on inclines.

Referring to FIGS. 1 and 2, a circular bumper 77 is mounted on the outer end of steering arm 39. The inner ends of bumper 77 are slidably mounted to arm 39 between bracket plates 78 as by bolts with tension washers or the like. One of the inner ends of bumper 77 includes a slot through which toggle switch 69 projects. Bumper 76 functions as a safety device to actuate toggle switch 69 into reverse should lift truck 1 inadvertently trap the operator while in the forward drive mode.

In operation, in order to raise a load truck 1 is backed up near the load and straps 21 are attached thereto. Chain portions 19 are then adjusted so that any slack in straps 21 is eliminated. To raise a load, toggle switch 68 is thrown upwardly, as shown in Fig. 5, which energizes valve 51 to permit fluid flow into port A of cylinder 25 and out of port B to reservoir 48. To lower a load, switch 68 is thrown downwardly which deenergizes valve 51 and energizes valves 50 and 49 to allow fluid to flow into port B of cylinder 25 and out of port A to reservoir 48.

In order to tow a load and drive wheel 42 forwardly, toggle switch 69 is thrown upwardly and push button 71 is depressed so that shuttle valve 55 is energized to allow fluid to flow through line 52 into port C of motor 43 and out of port D through line 53 into line 47 and then to reservoir 48. In order to drive truck 1 in reverse, toggle switch 69 is thrown rearwardly and push button 71 is depressed to deenergize valve 55 and energize valves 54 and 49 so that fluid will flow through line 53 into port D of motor 43 and out of port C through line 52 and into line 46 to reservoir 48.

During either operation, the speed of either raising and lowering a load or driving wheel 42 in forward or reverse may be regulated by toggle switch 70. If switch 70 is thrown, valve 58 is energized to a closed a position to thereby force fluid from pump 44 to pass through the regulating orifice of valve 59 to slow down the particular operation being performed. In order to extend brake cylinder 61 and release the brakes applied to rear wheels 7, valve 64 is moved to its spring returned position as shown in FIG. 4. However, in order to apply the brake, valve 64 is energized so that the spring within cylinder 61 may act to apply the brake.

A lift truck 1 has been illustrated and described. Various modifications and/or substitutions may be made to the specific components described herein without departing from the scope of the invention. For example, various types of hydraulic and electrical components may be employed.

Various modes of carrying out the invention are contemplated as being within the scope of the following claims particularly pointing out and distinctly claiming the subject matter which is regarded as the invention.

We claim:

1. A powered lift truck for lifting and transporting loads, comprising:

a rear frame;

a pair of rear wheels rotatably mounted on opposite sides of said rear frame;

an upstanding stationary mast member mounted on said rear frame;

a vertically movable mast member telescopically received within said stationary mast member, said vertically movable mast member defining a longitudinal axis and including a free upper end;

a load support carriage mounted on said movable mast member for vertical movement therewith, said carriage rotatably mounted on the free upper end of said vertically movable mast member for rotational movement only in a horizontal plane about an axis parallel to and coincident with the longitudinal axis of said verticaly movable mast member;

hydraulic lifting means mounted on said rear frame and operatively connected to said movable mast member for raising and lowering a load, said hydraulic lifting means includes an upstanding fluid actuated lift cylinder disposed parallel to and forwardly of said mast members;

a front frame pivotally connected to said rear frame;

a drive wheel rotatably mounted on said front frame;

hydraulic drive means on said front frame for driving said drive wheel;

a steering arm pivotally connected to said front frame for pivoting said front frame relative to said rear frame for steering the truck;

said rear frame is T-shaped and includes a first laterally extending channel member, and a second channel member extending forwardly from the center of said first channel member, an both said stationary mast member and said cylinder are mounted on said second channel member; and a cabinet on said rear frame, said cabinet includes a bottom wall, a pair of opposite side walls, and upright rear and front walls, said rear wall extending along the length of said first channel member and affixed to both said first channel member and said stationary mast member to aid in preventing sagging of said first channel member, and said bottom wall is affixed to said first channel member and said second channel member to aid in preventing lateral movement of said second channel member.

2. The lift truck of claim 1, wherein said carriage includes a cross bar member extending transversely of said movable mast member in a lateral direction, and a pair of rearwardly projecting bracket members spaced on opposite ends of said cross bar member.

3. The lift truck of claim 2, wherein said carriage further includes bracing means for reinforcing said cross bar member.

4. The lift truck of claim 3, wherein said bracing means includes a pair of braces extending between said movable mast member and opposite ends of said cross bar member.

5. The lift truck of claim 2, wherein said carriage further includes a pair of slings spaced on opposite ends of said cross bar member and supported by said bracket members, and mounting means for mounting said slings on the ends of said cross bar member so that the length of said slings with respect to the ends of the cross bar member may be varied.

6. The lift truck of claim 5, wherein each sling includes a chain portion having a plurality of links, and said mounting means includes a pair of forwardly projecting plate members spaced on opposite ends of said cross bar member, each plate member having a slot formed therethrough for receiving one of said links to hold said chain portion at a desired length.

7. The lift truck of claim 6, wherein said mounting means further includes a pair of vertically upright pins spaced on opposite ends of said cross bar member about which said chain portions are trained.

8. The lift truck of claim 5, wherein each of said bracket members include a pair of spaced apart side members and a transverse member extending between the outer ends of said side members.

9. The lift truck of claim 1, wherein said drive wheel is mounted directly to said hydraulic drive means.

10. The lift truck of claim 1, further including an upstanding support member mounted on the forward end of said second channel member, said support member includes a forwardly projecting bracket portion to which said front frame is pivotally connected.

11. The lift truck of claim 10, further including a reinforcing bracket extending between and affixed to said upstanding support member, said stationary mast member, and said cylinder.

12. The lift truck of claim 10, wherein said support member is hollow and forms a reservoir for the hydraulic fluid for said drive means and said lifting cylinder.

13. The lift truck of claim 1, further including a hydraulic system including a hydraulic pump for pumping fluid, an electric motor for rotating said pump, a first fluid line between said pump and one end of said lifting cylinder, a second fluid line between the other end of said lifting cylinder and a reservoir, an electrically actuated cross over shuttle valve interposed in said first and second fluid lines, a first electrically actuated flow control shuttle valve interposed in said first fluid line, a second electrically actuated flow control shuttle valve interposed in said second fluid line, and an electric control circuit housed in said steering arm which activates said electric motor and valves in the appropriate sequence to raise and lower said movable mast member and carriage.

14. The lift truck of claim 13, wherein said hydraulic drive means includes a reversible hydraulic motor, and said hydraulic system further includes a third fluid line between said first fluid line and one side of said motor communicating with said first fluid line between said cross over shuttle valve and said first flow control shuttle valve, a fourth fluid line between said second fluid line and the other side of said motor communicating with said second fluid line between said cross over shuttle valve and said second flow control shuttle valve, a third electrically actuated flow control shuttle valve interposed in said third fluid line, and a fourth electrically actuated flow control shuttle valve interposed in said fourth fluid line.

15. The lift truck of claim 14, wherein each of said flow control shuttle valves are movable between a first position which permits flow only in one direction and a second position which permits flow in two directions, and said hydraulic system further includes a pilot operated counterbalance valve disposed in each of said third and fourth fluid lines between said motor and said flow control shuttle valves.

16. The lift truck of claim 14, further including a normally open electrically actuated two-way valve and a priority flow control valve arranged in parallel relationship with one another in said first fluid line between said cross over shuttle valve and said pump.

17. The lift truck of claim 14, further including a spring loaded on and fluid actuated off brake cylinder, a fifth fluid line between said brake cylinder and said first fluid line communicating with said first line between said cross over shuttle valve and said pump, a sixth fluid line communicating between said fifth line and said reservoir, and an electrically actuated normally closed two-way valve disposed in said sixth line energizable to divert fluid flow from said brake cylinder and prevent movement of said rear wheels.

* * * * *